United States Patent
He et al.

(10) Patent No.: US 11,476,962 B2
(45) Date of Patent: Oct. 18, 2022

(54) METHOD, DEVICE AND APPARATUS FOR DETERMINING TIME INFORMATION

(71) Applicant: ZTE CORPORATION, Guangdong (CN)

(72) Inventors: Li He, Guangdong (CN); Xia Li, Guangdong (CN)

(73) Assignee: ZTE CORPORATION, Guangdong (CN)

(*) Notice: Subject to any disclaimer, the term of this patent is extended or adjusted under 35 U.S.C. 154(b) by 61 days.

(21) Appl. No.: 16/976,753

(22) PCT Filed: Feb. 27, 2019

(86) PCT No.: PCT/CN2019/076243
§ 371 (c)(1),
(2) Date: Aug. 30, 2020

(87) PCT Pub. No.: WO2019/165965
PCT Pub. Date: Sep. 6, 2019

(65) Prior Publication Data
US 2020/0412469 A1  Dec. 31, 2020

(30) Foreign Application Priority Data
Mar. 1, 2018 (CN) .......................... 201810171133.3

(51) Int. Cl.
*H04J 3/06* (2006.01)
*H04L 7/00* (2006.01)
(52) U.S. Cl.
CPC .......... *H04J 3/0602* (2013.01); *H04J 3/0661* (2013.01); *H04J 3/0667* (2013.01)

(58) Field of Classification Search
None
See application file for complete search history.

(56) References Cited

U.S. PATENT DOCUMENTS 8,385,374 B1 * 2/2013 Wohlgemuth .......... H04L 25/14
370/509
9,497,064 B2 * 11/2016 Su ..................... H04L 29/06993
(Continued)

FOREIGN PATENT DOCUMENTS

CN 103647615 A 3/2014
CN 107528654 A 12/2017
(Continued)

OTHER PUBLICATIONS

Japan Patent Office, First Office Action regarding JP2020-545493 dated Mar. 23, 2021.
(Continued)

*Primary Examiner* — Alpus Hsu
(74) *Attorney, Agent, or Firm* — Li & Cai Intellectual Property (USA) Office

(57) ABSTRACT

The present application discloses a method for determining time information, including: detecting a signal of a periodic block, and recording a timestamp of the periodic block; and determining a time at which a time information message to be sent according to the timestamp of the periodic block matched with the time information message, and generating a timestamp of the time information message. The present application further discloses an apparatus and device for determining time information, and a storage medium.

17 Claims, 9 Drawing Sheets

110
Detecting a signal of a periodic block, and recording a timestamp of the periodic block 120
Determining a time at which a time information message to be sent according to a timestamp of a periodic block matched with the time information message, and generating a timestamp of the time information message

(56) References Cited

U.S. PATENT DOCUMENTS

| | | | |
|---|---|---|---|
| 9,722,739 B2* | 8/2017 | Chapman | H04L 12/2801 |
| 2010/0049964 A1* | 2/2010 | Kondapalli | H04L 69/28 |
| | | | 713/150 |
| 2010/0153055 A1 | 6/2010 | Mucha et al. | |
| 2012/0082156 A1* | 4/2012 | Swartzentruber | H04L 7/0091 |
| | | | 370/389 |
| 2014/0092918 A1 | 4/2014 | Jost | |
| 2016/0352500 A1* | 12/2016 | Benjamini | H04J 3/0697 |
| 2017/0093757 A1 | 3/2017 | Gareau et al. | |
| 2019/0044839 A1* | 2/2019 | Landau | H04L 1/0041 |

FOREIGN PATENT DOCUMENTS

| | | |
|---|---|---|
| CN | 108880723 A | 11/2018 |
| CN | 109687927 A | 4/2019 |

OTHER PUBLICATIONS

European Patent Office, EP19760407.7 Extended European Search Report dated Mar. 9, 2021.
Mallela, et al., "Timing models for PTP in Ethernet networks" 2017 IEEE International Symposium on Precision Clock Synchronizaiton for Measurement, Control and Communication, issued on Aug. 28, 2017.
European Patent Office, EP19760407.7 First Office Action dated May 25, 2021.
China Patent Office, CN201810171133.3 First Office Action dated May 24, 2021.
WIPO, International Search Report dated Apr. 30, 2019.
Korea Patent Office, KR10-2020-7027891 Second Office Action dated Apr. 18, 2022.

* cited by examiner

100G BASE-R Alignment mark encodings

| PCS lane No. | Encoding {$M_0, M_1, M_2, BIP_3, M_4, M_5, M_6, BIP_7$} | PCS lane No. | Encoding {$M_0, M_1, M_2, BIP_3, M_4, M_5, M_6, BIP_7$} |
|---|---|---|---|
| 0 | 0xC1, 0x68, 0x21, $BIP_3$, 0x3E, 0x97, 0xDE, $BIP_7$ | 10 | 0xFD, 0x6C, 0x99, $BIP_3$, 0x02, 0x93, 0x66, $BIP_7$ |
| 1 | 0x9D, 0x71, 0x8E, $BIP_3$, 0x62, 0x8E, 0x71, $BIP_7$ | 11 | 0xB9, 0x91, 0x55, $BIP_3$, 0x46, 0x6E, 0xAA, $BIP_7$ |
| 2 | 0x59, 0x4B, 0xE8, $BIP_3$, 0xA6, 0xB4, 0x17, $BIP_7$ | 12 | 0x5C, 0xB9, 0xB2, $BIP_3$, 0xA3, 0x46, 0x4D, $BIP_7$ |
| 3 | 0x4D, 0x95, 0x7B, $BIP_3$, 0xB2, 0x6A, 0x84, $BIP_7$ | 13 | 0x1A, 0xF8, 0xBD, $BIP_3$, 0xE5, 0x07, 0x42, $BIP_7$ |
| 4 | 0xF5, 0x07, 0x09, $BIP_3$, 0x0A, 0xF8, 0xF6, $BIP_7$ | 14 | 0x83, 0xC7, 0xCA, $BIP_3$, 0x7C, 0x38, 0x35, $BIP_7$ |
| 5 | 0xDD, 0x14, 0xC2, $BIP_3$, 0x22, 0xEB, 0x3D, $BIP_7$ | 15 | 0x35, 0x36, 0xCD, $BIP_3$, 0xCA, 0xC9, 0x32, $BIP_7$ |
| 6 | 0x9A, 0x4A, 0x26, $BIP_3$, 0x65, 0xB5, 0xD9, $BIP_7$ | 16 | 0xC4, 0x31, 0x4C, $BIP_3$, 0x3B, 0xCE, 0xB3, $BIP_7$ |
| 7 | 0x7B, 0x45, 0x66, $BIP_3$, 0x84, 0xBA, 0x99, $BIP_7$ | 17 | 0xAD, 0xD6, 0xB7, $BIP_3$, 0x52, 0x29, 0x48, $BIP_7$ |
| 8 | 0xA0, 0x24, 0x76, $BIP_3$, 0x5F, 0xDB, 0x89, $BIP_7$ | 18 | 0x5F, 0x66, 0x2A, $BIP_3$, 0xA0, 0x99, 0xD5, $BIP_7$ |
| 9 | 0x68, 0xC9, 0xFB, $BIP_3$, 0x97, 0x36, 0x04, $BIP_7$ | 19 | 0xC0, 0xF0, 0xE5, $BIP_3$, 0x3F, 0x0F, 0x1A, $BIP_7$ |

Fig. 5

METHOD, DEVICE AND APPARATUS FOR DETERMINING TIME INFORMATION

CROSS-REFERENCE OF RELATED APPLICATIONS

The present application is a US National Stage of International Application No. PCT/CN2019/076243, filed on Feb. 27, 2019, designating the United States, and claiming the priority of Chinese Patent Application No. 201810171133.3 filed with the SIPO on Mar. 1, 2018, which is hereby incorporated by reference in its entirety.

TECHNICAL FIELD

The present application relates to the communication field, and in particular, to a method, device and apparatus for determining time information, and a storage medium.

BACKGROUND

Ultra-high precision time and frequency synchronization has always been a goal of basic science and technology, and plays an important role in the fields such as the navigation field. Furthermore, precision timing and synchronization have extensive and important applications in the fields of basic science, astronomical observation, national defense and security, communications, and finance.

The ultra-high precision time synchronization is implemented in difference ways, which result in different accuracies and costs, but the different ways are roughly divided into out-of-band methods and in-band methods.

The in-band methods are to transmit a time signal along with a service, and the acquisition of timestamp information is arranged as close to a physical layer as possible. With time signals transmitted with the services, in-band timestamps have little dependence on optical modules and are low in cost, and therefore are preferred in the communication industry. However, communication products have numerous and complex interfaces, to which more and more digital domain processing methods are applied for transmitting services at higher speeds, which brings a big challenge to higher-precision time transmission.

The IEEE 1588 protocol for Ethernet is mainly implemented by identifying a synchronization frame header at a Media Access Control (MAC) layer and recording timestamp information.

However, since different Ethernet interfaces have various rates and there is a big difference in the digital domain processing before the timestamps of MAC layer are recorded, the factors, such as a phase difference introduced by a link clock, a change in a clock domain and a depth of First Input First Output (FIFO), may cause uncertain delay, which may further affect system accuracies.

SUMMARY

The embodiments of the present disclosure provide a method, device and apparatus for determining time information, and a storage medium, which enable Ethernet interfaces to acquire high-precision time.

According to an embodiment of the present disclosure, provided is a method for determining time information, including: detecting a signal of a periodic block, and recording a timestamp of the periodic block; and determining a time at which a time information message to be sent according to the timestamp of the periodic block matched with the time information message, and generating a timestamp of the time information message.

According to an embodiment of the present disclosure, provided is a method for determining time information, including: detecting a signal of a periodic block, and recording a timestamp of the periodic block; and determining a time at which a time information message to be received, according to the timestamp of the periodic block matched with the time information message.

According to an embodiment of the present disclosure, provided is a device for determining time information, including: a detection module configured to detect a signal of a periodic block, and record a timestamp of the periodic block; and a determination module configured to determine a time at which a time information message to be sent according to the timestamp of the periodic block matched with the time information message, and generate a timestamp of the time information message.

According to an embodiment of the present disclosure, provided is an apparatus for determining time information, including: a processor; a memory configured to store instructions that are capable of being executed by the processor; and a transmission device configured to transmit and receive data for communication under the control of the processor. The processor is configured to perform the following operations: detecting a signal of a periodic block, and recording a timestamp of the periodic block; and determining a time at which a time information message to be sent according to the timestamp of the periodic block matched with the time information message, and generating a timestamp of the time information message.

According to an embodiment of the present disclosure, provided is a device for determining time information, including: a detection module configured to detect a signal of a periodic block, and record a timestamp of the periodic block; and a determination module configured to determine a time at which a time information message to be received, according to the timestamp of the periodic block matched with the time information message.

According to an embodiment of the present disclosure, provided is an apparatus for determining time information, including: a processor; a memory configured to store instructions that are capable of being executed by the processor; and a transmission device configured to transmit and receive data for communication under the control of the processor. The processor is configured to perform the following operations: detecting a signal of a periodic block, and recording a timestamp of the periodic block; and determining a time at which a time information message to be received, according to the timestamp of the periodic block matched with the time information message.

According to an embodiment of the present disclosure, provided is a computer-readable storage medium having computer-executable instructions stored therein, and the computer-executable instructions may be executed by a processor to implement the method of any one of the above embodiments

BRIEF DESCRIPTION OF THE DRAWINGS

The accompanying drawings are intended to provide an understanding of the technical solutions of the present disclosure, and are incorporated in and constitute a part of the Specification. The drawings, together with the embodiments of the present disclosure, are intended to explain the technical solutions of the present disclosure, but not to constitute a limitation to the technical solutions of the present disclosure.

FIG. 1 is a schematic diagram illustrating a time synchronization process.

FIG. 5 is a schematic diagram of a format of an Alignment Mark (AM).

DETAILED DESCRIPTION

The embodiments and the features thereof in the present application may be arbitrarily combined with one another if no conflict is incurred.

The steps illustrated in the flowcharts of the drawings may be performed in a computer system such as a set of computer-executable instructions. In addition, although a logical order is illustrated in the flowchart, the steps illustrated or described may be performed in an order different from that described herein in some cases.

The Precision Time Protocol (PTP), such as the 1588 Protocol, is usually used to synchronize a master clock and a slave clock in a distributed system. Accordingly, the time information messages used are generally 1588 event messages.

In a synchronization process of a system, a master clock periodically publishes PTP time synchronization and time information, a slave clock port receives timestamp information sent from a master clock port, and the system calculates master-slave line delay and master-slave time difference according to the timestamp information, and adjusts local time by using the time difference, so as to keep slave clock node time at the same frequency and phase as master clock node time.

Figure 1:
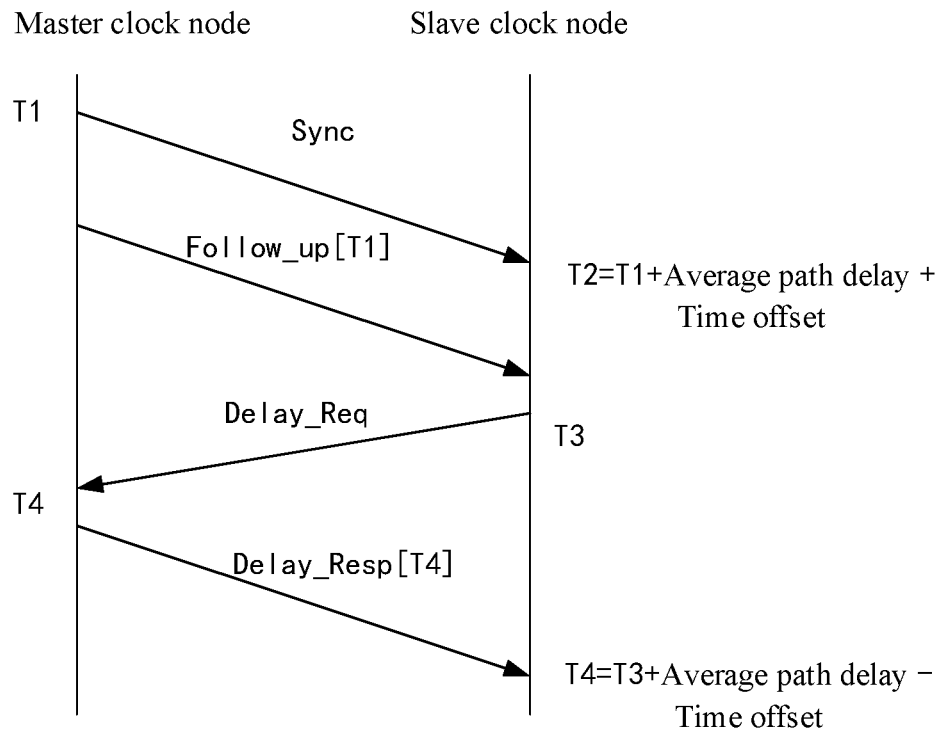

As shown in FIG. 1, the time synchronization process is as follows.

1. A master clock node (Master) sends a Sync message (Sync) to a slave clock node (Slave), and the time T1 at which the Sync message is sent is recorded in a register.

2. The slave clock node receives the Sync message, and the time T2 at which the Sync message is received is recorded.

3. The master clock node sends a Follow_Up message to the slave clock node, with the time T1 embedded in the Follow_Up message.

4. The slave clock node sends a Delay_Req message to the master clock node, with a timestamp T3 embedded in the Delay_Req message.

5. The master clock node receives the Delay_Req message and records time T4.

6. The master clock node embeds T4 in a Delay_Resp message, and sends the Delay_Resp message to the slave clock node.

An average path delay (Delay) and a time offset (Offset) between the master clock node and the slave clock node can be calculated according to T1, T2, T3 and T4.

The average path delay is represented as: Delay=[(T2−T1)+(T4−T3)]/2; and for the slave clock node, Delay+Offset=T2−T1. Therefore, the offset of the slave clock node is: Offset=T2−T1−Delay.

The clock of the slave clock node can be corrected according to the Offset, thereby realizing master-slave synchronization.

It can be seen from the above description that, if T1, T2, T3 and T4 are not accurate enough, there may be errors of the average path delay (Delay) and the time offset (Offset) obtained by the calculation, which may lead to a failure of precise master-slave synchronization.

For improving time accuracy, a periodic block is adopted as a timestep reference in the embodiments of the present disclosure.

Figure 2:
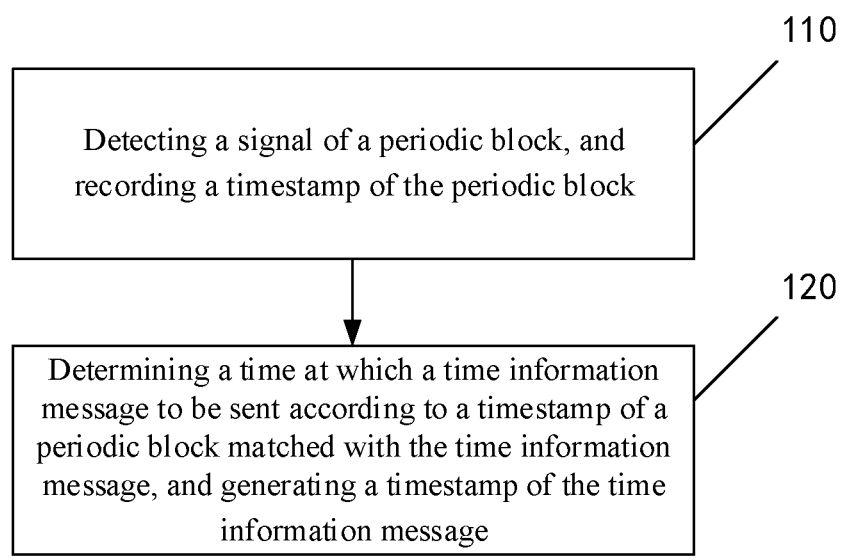
FIG. 2 is a flowchart illustrating a method for determining time information, which is applied to a transmitting end, according to an embodiment of the present disclosure.

As shown in FIG. 2, a method for determining time information, which is applied to a transmitting end, includes steps 110 and 120 according to an embodiment of the present disclosure.

In step 110, a signal of a periodic block is detected, and a timestamp of the periodic block is recorded.

In the embodiment, the transmitting end is an end from which a time information message is sent. With reference to FIG. 1, the transmitting end may be the master clock node or the slave clock node.

In one embodiment, the periodic block is a real AM or a virtual AM.

For 25 G Ethernet (25GE) and above which enable Reed Solomon-Forward Error Correction (RS-FEC) encoding or multi-channel services, there are AMs in data streams. The AMs are inserted at a physical coding sublayer (PCS) and may help to achieve data alignment between channels. In the embodiment, an AM may be used as a timestamp reference for an Ethernet interface containing the AMs.

For Ethernet with speeds lower than 25 G, there is no AM in data streams. In view of such case, it is put forward in an embodiment of the present disclosure that a virtual AM may be constructed to simulate a real AM; that is, before the step 110, the method further includes: generating a virtual AM.

The virtual AM in the embodiment may also be referred to as a virtual periodic block, and may be generated by generating periodic pulses, an effective signal of the virtual AM is sent to a parallel port along with data, a pulse is generated when the signal is detected at the parallel port, and a timestamp of the virtual AM is recorded. By adopting the virtual AM, the problem that no AM can be used in the case where there is no AM in the data streams on the Ethernet with speeds lower than 25 G can be solved, and a periodic block can be used as a timestamp reference at various rates, so that a unified solution for different rates is provided.

In one embodiment, the virtual AM is similar to a real AM, and is a periodic pulse, but the period and the frequency of the virtual AM may be different from those of the real AM, and may be set as required.

In one embodiment, for a multi-channel transmitting end, the AM used as a timestamp reference is the AM of a specified channel, for example, the AM of the channel with the highest power.

In step 120, a time at which a time information message to be sent is determined according to a timestamp of a periodic block matched with the time information message, and a timestamp of the time information message is generated.

The time information message may be a 1588 event message, such as the Sync message or the Delay_Req request message in FIG. 1.

In one embodiment, the periodic block matched with the time information message includes: a periodic block located before and adjacent to the time information message, that is, a periodic block before the time information message.

In one embodiment, determining the time at which the time information message to be sent according to the timestamp of the periodic block matched with the time information message includes: determining a time interval between an identifier carried by the time information message and the periodic block matched with the time information message; and determining the time at which the time information message to be sent according to the time interval and the timestamp of the periodic block matched with the time information message.

The identifier is generated at the same time when the time information message is generated. For example, the identifier may be located at a position of a start frame delimiter (SFD) in an SFD mode; and the identifier may be located at a position of an overhead header in a Flex Ethernet (FlexE) mode.

Figure 3:
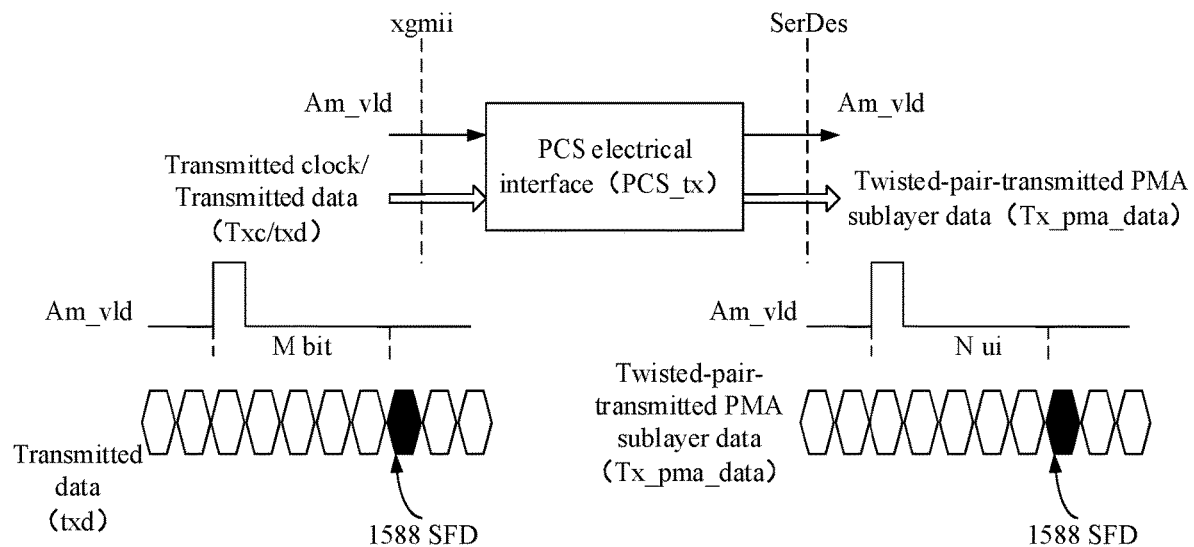
FIG. 3 is a schematic diagram illustrating conversion of time interval according to an embodiment of the present disclosure.

Taking the SFD mode as an example, as shown in FIG. 3, an interval M bit between a periodic block (am_vld) and an SFD of a time information message is detected at a 10 Gigabit media independent interface (xgmii) at a MAC layer, and may be converted into an interval N ui at a parallel port of a serializer/deserializer (SerDes), and ui represents unit interval; the time at which the time information message to be output at the parallel port can be obtained by adding the interval N ui to the timestamp of the periodic block, so that an accurate timestamp at the parallel port is obtained.

The conversion of the interval M bit between the periodic block (am_vld) and the SFD of the time information message into the interval N ui at the parallel port of the SerDes may be performed as follows: assuming that, before PCS encoding, the 1588 SFD is x 64-bit blocks away from the first block of the AM, and the SFD is at the y bit in the 64-th block, then $M=x*64+y$.

During the transmission from the MAC layer to the SerDes, the following steps may change the interval of the data, and may be divided as follows under two conditions according to whether Forward Error Correction (FEC) encoding is adopted in the PCS encoding.

1. No FEC Encoding.

With 64B/66B encoding being adopted alone, a 2-bit synchronization header is added to every block: $l_0=x*66+(y+2)$.

Under that condition, $l_0$ bit can be converted into N ui according to a conversion relationship between bit and ui.

2. There is FEC Encoding.

(1) For 64B/66B encoding, a 2-bit synchronization header is added to every block: $l_0=x*66+(y+2)$.

(2) For FEC encoding, every 32 blocks of the above x blocks form a group; and for the 32 blocks of each group, the first bit of each block is deleted, and 32-bit parity bits are added after the 32 blocks of 65-bit data. Thus, the number of bits between the SFD and the AM is:

$$l_1 = \left\lfloor \frac{x}{32} \right\rfloor *2112 + (x\%32)*65 + y + 1;$$

and under that condition, $l_1$ bit can be converted into N ui according to the conversion relationship between bit and ui.

In the embodiment, the transmitting end caches the time information message into a queue, and generates the identifier for the accompanying transmission, a pulse is generated when the signal of the AM is detected at the parallel port of the SerDes, and the timestamp of the AM is recorded; if the time information message is received in the cache, the time interval between the identifier of the sent time information message and the previous AM is recorded and is converted into the interval when sending at the parallel port, the interval is compensated for the timestamp of the AM, and the obtained timestamp is written to the Follow_Up message corresponding to the time information message, and the time information message in the cache is cleared.

In order to avoid false acquisition, the interval between the time information message and the periodic block is controlled in such a way that, if it is determined that a time interval between the time information message to be sent and the matched periodic block is greater than a preset threshold, the time information message to be sent is discarded. In this way, possible matching errors may be avoided, so as to further improve time accuracy.

In one embodiment, the preset threshold is ⅛ of a period of the periodic block.

In one embodiment, after the step 120, the method further includes: writing the timestamp of the time information message to a Follow_Up message corresponding to the time information message, and sending the Follow_Up message to a receiving end.

With reference to FIG. 1, the time T1 is sent to the slave clock node along with the Follow_Up message.

In the embodiments of the present disclosure, the periodic block is used as a timestamp reference, thereby avoiding the uncertain delay and effectively improving the time accuracy, for example, an accuracy of 100 G sub-ns level can be reached.

Figure 4:
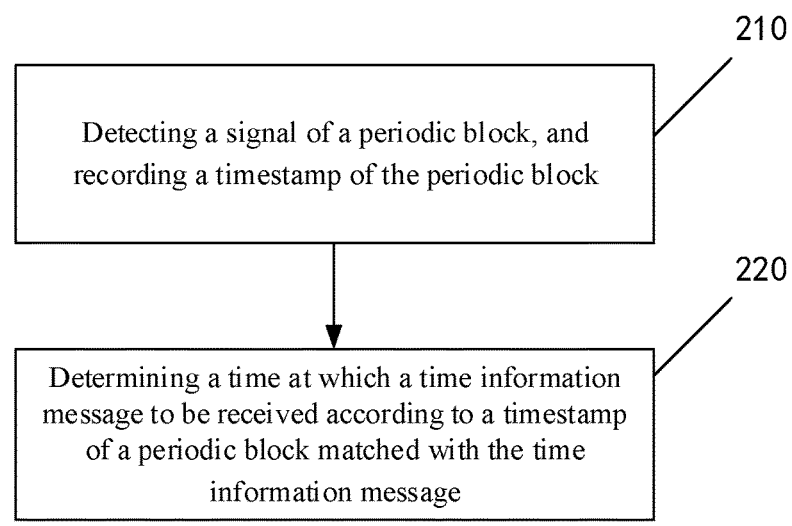
FIG. 4 is a flowchart illustrating a method for determining time information, which is applied to a receiving end, according to an embodiment of the present disclosure.

As shown in FIG. 4, a method for determining time information, which is applied to a receiving end, includes steps 210 and 220 according to an embodiment of the present disclosure.

In the step 210, a signal of a periodic block is detected, and a timestamp of the periodic block is recorded.

In the embodiment, the receiving end is an end that receives a time information message, and, as shown in FIG. 1, may be a slave clock node or a master clock node.

In one embodiment, the periodic block is a real AM or a virtual AM. That is, the periodic block is an AM, which includes a real AM and a virtual AM.

The AM used as a timestamp reference in the embodiments is an AM received from a transmitting end, that is, the transmitting end and the receiving end adopt the same timestamp reference.

For an Ethernet interface containing an AM, the AM may be used as a timestamp reference.

In the case where the periodic block is an AM, the step 210 may include: receiving data sent by a transmitting end, detecting a signal of an AM in the data, identifying the AM, and recording a timestamp of the AM if the identification is successful; and if the identification fails, taking a counter timestamp corresponding to the AM as the timestamp of the AM, and recording the timestamp.

The step of detecting the signal of the AM in the data and identifying the AM may include: searching for the signal of the AM in the data; determining that the identification is successful if the AM is successfully identified at a position of AM in the data in each of two consecutive periods; otherwise, determining that the identification fails, the period being a period of the AM.

In order to avoid a failure of obtaining the timestamp of the periodic block due to unsuccessful AM identification, it is put forward in the embodiment that counter timestamps are used to simulate the timestamps of the AM, a counter is started or restarted every time an AM in the data is successfully identified, and the counter generates the counter timestamps according to the period of the AM, so that the timestamp of the AM may still be obtained at the receiving end according to the simulated counter timestamp if the AM identification fails, thereby avoiding loss of the timestamp reference.

For an Ethernet interface containing no AM, the periodic block is a virtual AM.

In one embodiment, before the step 210, the method further includes: generating a virtual AM.

Like the case of the transmitting end, a periodic virtual signal is generated at an input of the parallel port of the SerDes as a virtual AM signal to generate timestamps.

In the step 220, a time at which a time information message to be received is determined according to a timestamp of a periodic block matched with the time information message.

In one embodiment, the periodic block matched with the time information message includes: a periodic block located before and adjacent to the time information message, that is, a periodic block before the time information message.

In one embodiment, the step of determining the time at which the time information message is received according to the timestamp of the periodic block matched with the time information message includes: determining a time interval between an identifier carried by the time information message and the periodic block matched with the time information message; and determining the time at which the time information message to be received according to the time interval and the timestamp of the periodic block matched with the time information message.

In one embodiment, the identifier is located at a position of an SFD, or at a position of an overhead header.

In the case where the periodic block is an AM, the timestamp of the previous AM of the received event message is taken as the timestamp of the message, the identifier is generated, and is transmitted to the position where the SFD is generated at the MAC layer in the SFD mode, or is transmitted to the position of the overhead header in the FlexE mode; and the interval between the AM and the identifier is recorded and is converted into the interval when receiving at the parallel port of the SerDes, and the interval is compensated for the timestamp of the AM to generate an accurate timestamp of the time information message at the parallel port.

In the case where the periodic block is a virtual AM, the signal of the virtual AM is generated at the input of the parallel port of the SerDes, and the timestamp is generated according to the virtual AM. The identifier is generated, and is transmitted to the position where the SFD is generated at the MAC layer in the SFD mode, or is transmitted to the position of the overhead header in the FlexE mode; and the interval between the virtual AM and the identifier is recorded and is converted into the interval when receiving at the parallel port of the SerDes according to the known conversion relationship, and the interval is compensated for the timestamp of the virtual AM to generate an accurate timestamp of the time information message at the parallel port.

In the embodiments of the present disclosure, the periodic block is used as a timestamp reference, thereby avoiding the uncertain delay and effectively improving the time accuracy, for example, an accuracy of 100 G sub-ns level can be reached.

Application examples are provided below for illustration.

In the description of the application examples, the time information messages are 1588 event messages. The ultra-high precision time synchronization adopts a periodic block such as an AM as a reference plane, and the AM is a periodically generated alignment mark. A virtual AM is constructed in the case where there is no real AM at a port.

Application Example One

Taking a 100GE Ethernet model as an example, 100G is an Ethernet interface containing an AM, and the same method is applicable to other Ethernet interfaces containing AMs.

The functions of the PCS are as follows.

Transmitting direction: 64B/66B encoding, scrambling, block distribution, and AM insertion.

Receiving direction: 66B block synchronization, AM lock of PCS lane, lane rearrangement, AM deletion, descrambling, and 64B/66B decoding.

For the rearrangement of the lanes at the receiving side, a 66-bit AM is periodically inserted in each lane after the block distribution module. The AM needs scrambling. An AM is inserted every 16,384 66-bit blocks in every lane.

An AM frame format consists of synchronization header, M0/M1/M2, M4/M5/M6, and BIP3/BIP7. For achieving DC (Direct Current)-balance, M4/M5/M6 is the bitwise inversion of M0/M1/M2, and BIP7 is the bitwise inversion of BIP3. The AM format is shown in FIG. 5.

The encoded and scrambled data stream is distributed in a unit of 66-bit block to a plurality of virtual channels in a polling way. Reconstruction of the data stream relies on the alignment mark.

Transmitting End

The transmitting end may configure an AM timestamp mode to start or close.

Figure 6:
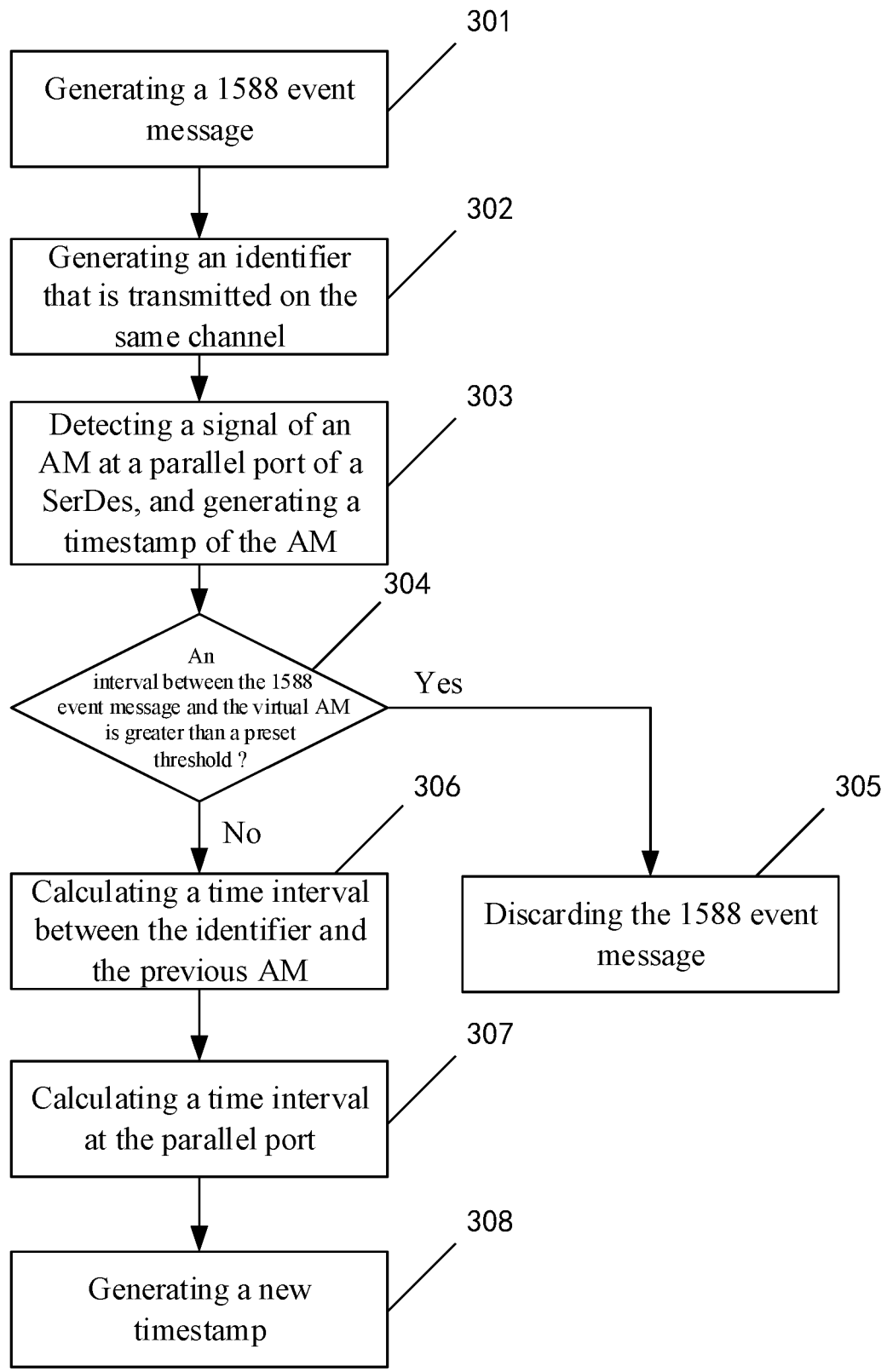
FIG. 6 is a flowchart illustrating a method for determining time information at a transmitting end according to First Application Example of the present disclosure.

Taking to start the AM timestamp mode as an example, as shown in FIG. 6, the method for determining accurate time information includes the following steps.

In step 301, generating a 1588 event message.

The 1588 event message is generated at the MAC layer.

In step 302, generating an identifier that is transmitted on the same channel.

When the 1588 event message is generated, a block where the header of the to-be-timestamped 1588 event message is located is marked with the identifier.

In step 303, detecting a signal of an AM at a parallel port of a SerDes, and generating a timestamp of the AM.

A pulse is generated when the signal of the AM is detected at the parallel port of the SerDes, and the timestamp of the AM is recorded.

In step 304, determining whether an interval between the 1588 event message and the AM is greater than a preset threshold, if so, performing step 305, and otherwise, performing step 306.

The identifier is transmitted on the same channel, without being affected by encoding; and when transmitted to a junction of a PCS and a Physical Medium Attachment (PMA) sublayer, the interval between the 1588 event message and the AM is controlled in order to avoid false acquisition, so that it is determined whether the interval between the 1588 event message and the previous AM is greater than the preset threshold.

The preset threshold may be set, and may be set to be ⅛ of a natural period of the AM.

In step 305, discarding the 1588 event message.

A packet is sent until the next AM; and when the next event message of the same type arrives, the cache is cleared, and the 1588 event message is discarded.

In step 306, calculating a time interval between the identifier and the previous AM.

The time interval between the identifier (i.e., a current block count value) and the previous AM.

In step 307, calculating a time interval at the parallel port.

The block count value is compensated for the timestamp of the AM to calculate an interval between the AM and a standard timestamp generation plane, and the interval is converted into the time interval at the parallel port of the SerDes.

In step 308, generating a new timestamp.

The time interval at the parallel port of the SerDes is compensated for the timestamp of the AM to generate an accurate timestamp of the time information message at the parallel port. The timestamp of the time information message is written to the corresponding 1588 event message (Follow_Up message), and the corresponding event message is cleared from the cache.

Receiving End

Figure 7:
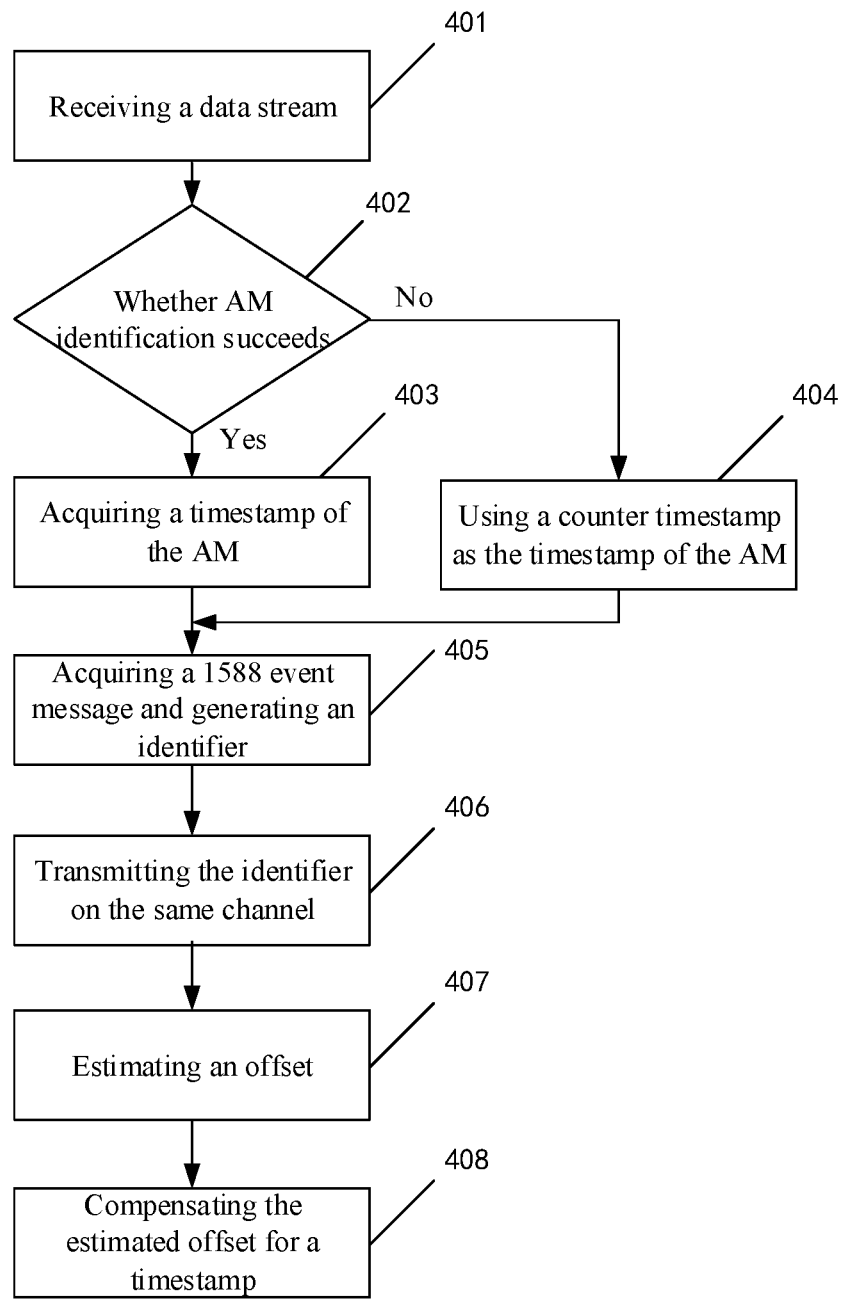
FIG. 7 is a flowchart illustrating a method for determining time information at a receiving end according to First Application Example of the present disclosure.

As shown in FIG. 7, the method for determining accurate time information at the receiving end includes the following steps.

In step 401, receiving a data stream.

The receiving end determines the channel where time is transferred according to the signal received from an opposite end.

In step 402, identifying an AM, performing step 403 if the identification is successful, and performing step 404 if the identification fails.

AMs are searched for on the channel where the time is transferred, invalid beats of 16,384 blocks are taken as a period, and the AM identification on the current channel is considered to be successful if the AM is found and is correctly identified at a corresponding position in each of two consecutive periods; otherwise, the identification fails.

A rechecking process is continuously performed after the identification is successful, and it is determined that the AMs on the channel cannot be identified when the AMs are found to be incorrect for N consecutive times, and then a new AM searching process is performed, N being an integer greater than or equal to 2.

In step 403, acquiring a timestamp of the AM, and performing step 405.

The timestamps of all the AMs on the channel where the time is transferred are recorded.

In step 404, using a counter timestamp as the timestamp of the AM.

A counter is started every time an AM is received, and generates a counter timestamp when counting to the period of the AM; if no AM has been received when an event message is received, a counter timestamp is used as an AM timestamp, and the counter is reset and started to count again when a new AM is received.

In step 405, acquiring a 1588 event message and generating an identifier.

In step 406, transmitting the identifier on the same channel.

The identifier is transmitted to a position where an SFD is generated at a MAC layer in the SFD mode, or is transmitted to a position of an overhead header in the FlexE mode.

In step 407, estimating an offset.

An interval between the AM and the 1588 event message is recorded at the MAC layer, and is converted into an interval when receiving at the parallel port of the SerDe.

In step 408, compensating the estimated offset for a timestamp.

The offset is compensated for a corresponding AM timestamp, and the obtained timestamp is inserted in a corresponding event message.

Application Example Two

Taking a LOGE Ethernet model containing no AM as an example, 10 G is an Ethernet interface containing no AM, and the same method is applicable to other Ethernet interfaces containing no AM.

Transmitting End

Figure 8:
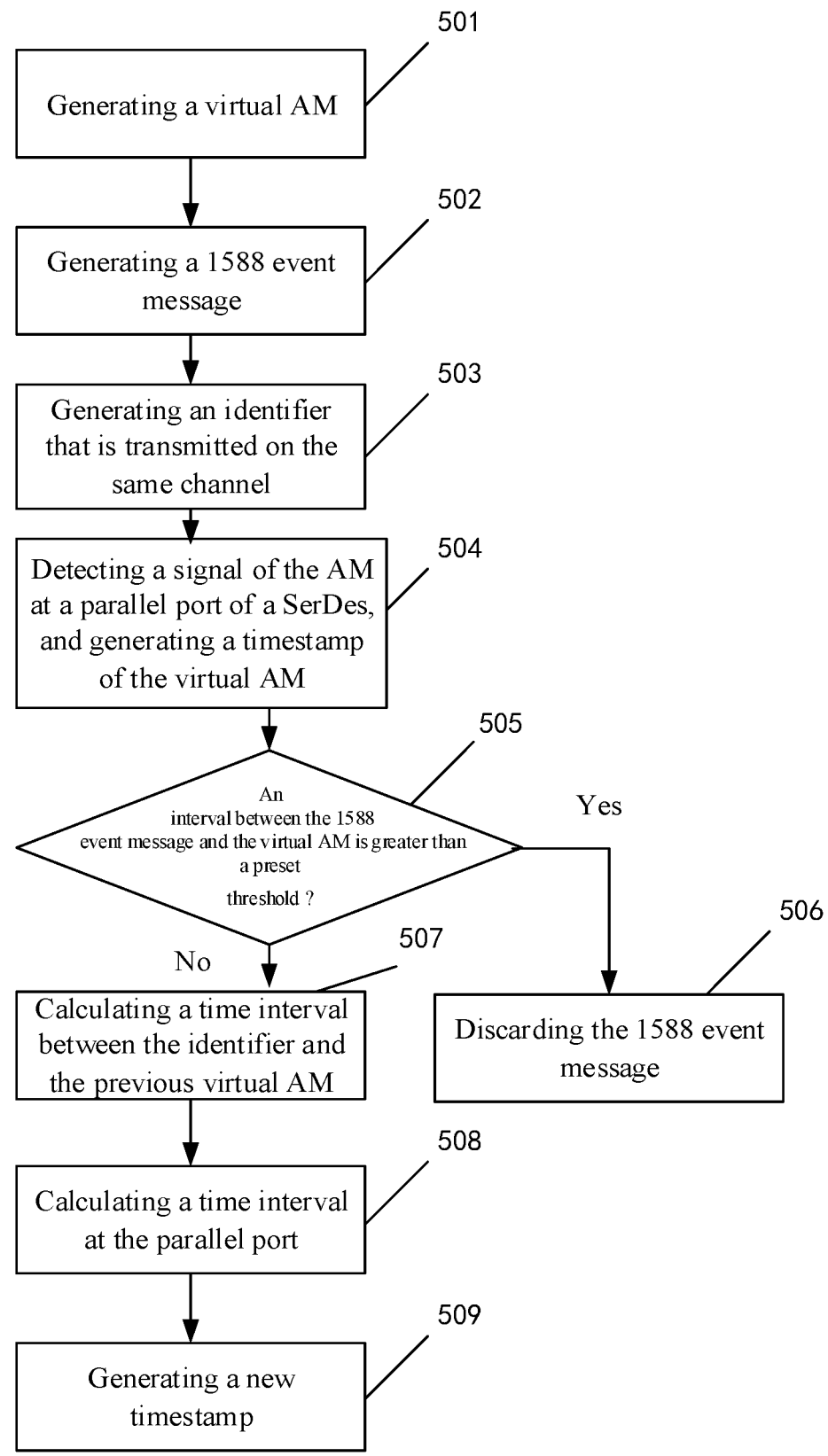
FIG. 8 is a flowchart illustrating a method for determining time information at a transmitting end according to Second Application Example of the present disclosure.

As shown in FIG. 8, the method for determining accurate time information includes the following steps.

In step 501, generating a virtual AM.

A virtual AM is periodically generated at the MAC layer, the period being 81,920 64bits, and a valid signal of the AM is sent to the PCS along with data.

In step 502, generating a 1588 event message.

The 1588 event message is generated at the MAC layer.

The 1588 event message is cached in the form of an FIFO queue, with one cache depth for each type of event messages.

In step 503, generating an identifier that is transmitted on the same channel.

When 1588 event messages are generated, a block where the header of a to-be-timestamped 1588 event message is located is marked with an identifier.

In step 504, detecting a signal of the virtual AM at a parallel port of a SerDes, and generating a timestamp of the virtual AM.

The signal of the virtual AM is output from the PCS to the parallel port of the SerDes, a pulse is generated when the signal is detected at the parallel port, and the timestamp of the virtual AM is recorded.

In step 505, determining whether an interval between the 1588 event message and the virtual AM is greater than a preset threshold, if so, performing step 506, and otherwise, performing step 507.

The identifier is transmitted on the same channel, without being affected by encoding; and when transmitted to a junction of the PCS and a PMA sublayer, the interval between the 1588 event message and the virtual AM is controlled in order to avoid false acquisition, therefore, it is determined whether the interval between the 1588 event message and the previous virtual AM is greater than the preset threshold.

The preset threshold may be set, and may be set to be ⅛ of a natural period of the AM.

In step 506, discarding the 1588 event message.

A packet is sent until the next AM; and when the next event message of the same type arrives, the cache is cleared, and the 1588 event message is discarded.

In step 507, calculating a time interval between the identifier and the previous virtual AM.

The time interval between the identifier of the event message to be sent and the previous virtual AM is recorded at the MAC layer.

In step 508, calculating a time interval at the parallel port.

The time interval between the identifier of the event message to be sent and the previous virtual AM is converted into an interval when sending at the parallel port of the SerDes.

In step 509, generating a new timestamp.

The time interval at the parallel port of the SerDes is compensated for the timestamp of the virtual AM to generate an accurate timestamp of the 1588 event message at the parallel port. The accurate timestamp is written to a corresponding 1588 event message (Follow_Up message), and the corresponding event message is cleared from the cache.

Receiving End

Figure 9:
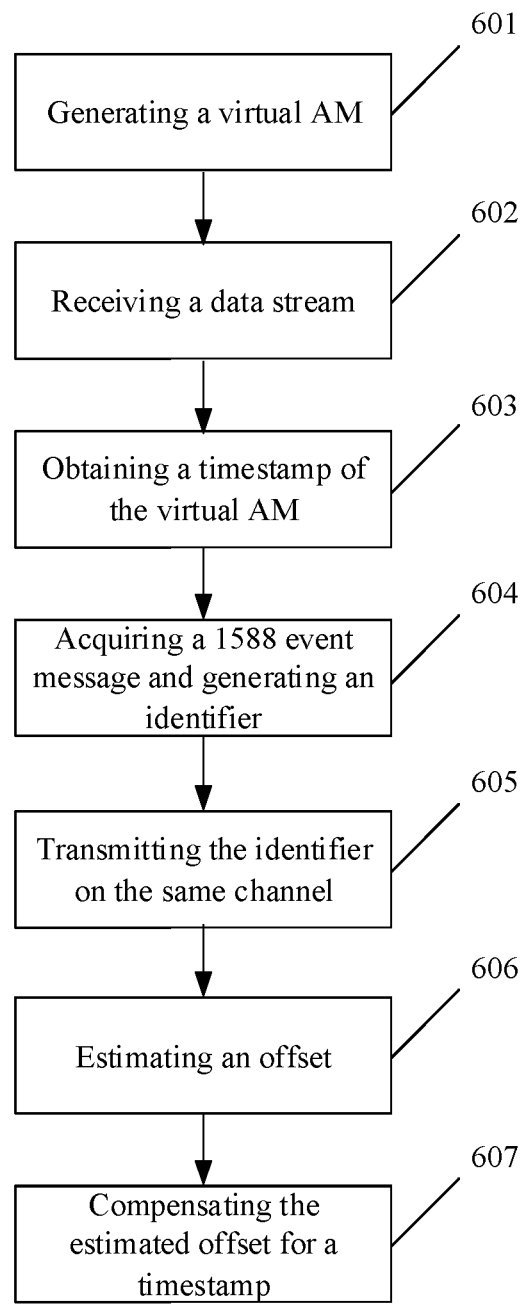
FIG. 9 is a flowchart illustrating a method for determining time information at a receiving end according to Second Application Example of the present disclosure.

As shown in FIG. 9, the method for determining accurate time information at the receiving end includes the following steps.

In step 601, generating a virtual AM.

Like the case of the transmit end, a virtual AM is periodically generated at an input of the parallel port of the SerDes, the period being 81,920 66 bits.

In step 602, receiving a data stream.

The receiving end receives the signal according to an opposite end.

In step 603, obtaining a timestamp of the virtual AM.

The virtual AM is timestamped by using the PTP, is transmitted to the PCS, and then is transmitted to the MAC layer together with the data from the PCS.

In step 604, acquiring a 1588 event message and generating an identifier.

In step 605, transmitting the identifier on the same channel.

The identifier is transmitted to a position where an SFD is generated at the MAC layer in the SFD mode, or is transmitted to a position of an overhead header in the FlexE mode.

In step 606, estimating an offset.

An interval between the virtual AM and the 1588 event message is recorded at the MAC layer, and is converted into an interval when receiving at the parallel port of the SerDes.

In step 607, compensating the estimated offset for a timestamp.

The offset is compensated for a timestamp of the corresponding virtual AM, and the obtained timestamp is inserted in a corresponding event message.

A device for determining time information, which is applied to a transmitting end, is further provided according to an embodiment of the present disclosure, and the device is configured to implement the above embodiments and examples, and what has been illustrated above will not be repeated here. The term "module" used in the following description may be a combination of software and/or hardware that may perform predetermined functions. Although the devices described in the embodiments below may be implemented by software, it is possible and may be envisaged that that the devices are implemented by hardware or a combination of software and hardware.

Figure 10:
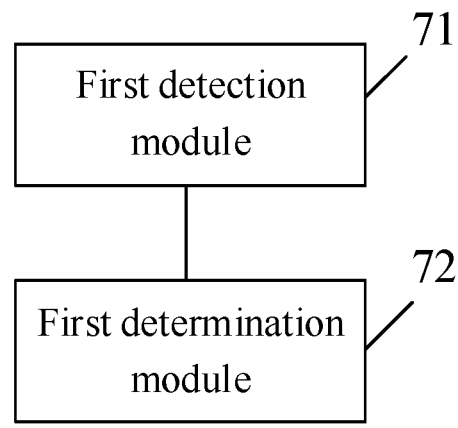
FIG. 10 is a schematic diagram of a device for determining time information, which is applied to a transmitting end, according to an embodiment of the present disclosure.

As shown in FIG. 10, the device for determining time information according to an embodiment of the present disclosure includes: a first detection module 71 configured to detect a signal of a periodic block, and record a timestamp of the periodic block; and a first determination module 72 configured to determine a time at which a time information message to be sent according to the timestamp of the periodic block matched with the time information message, and generate a timestamp of the time information message.

In one embodiment, the periodic block is a real AM or a virtual AM.

In one embodiment, the device further incudes: a first generation module configured to generate the virtual AM.

In one embodiment, the first determination module 72 is configured to: determine a time interval between an identifier carried by the time information message and the periodic block matched with the time information message, and determine the time at which the time information message to be sent according to the time interval and the timestamp of the periodic block matched with the time information message.

In one embodiment, the identifier is located at a position of an SFD or at a position of an overhead header.

In one embodiment, the device further incudes: a discarding module configured to discard the time information message to be sent if it is determined that a time interval between the time information message to be sent and a matched periodic block is greater than a preset threshold.

In the embodiments of the present disclosure, the periodic block is used as a timestamp reference, thereby avoiding the uncertain delay and effectively improving the time accuracy, for example, an accuracy of 100 G sub-ns level can be reached.

Figure 11:
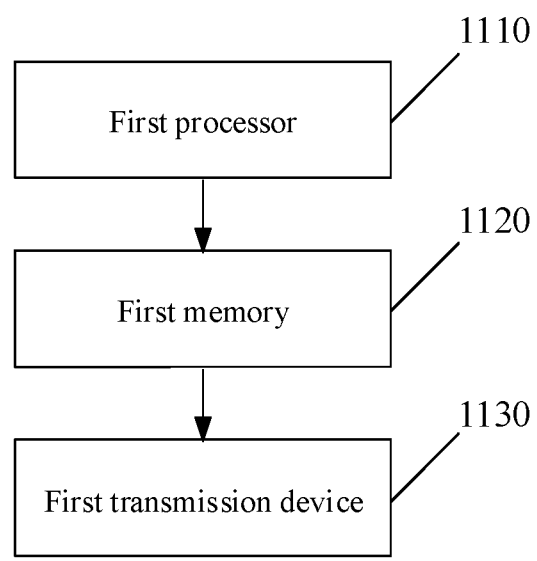
FIG. 11 is a schematic structural diagram of an apparatus for determining time information according to an embodiment of the present disclosure.

An apparatus for determining time information is further provided according to an embodiment of the present disclosure. As shown in FIG. 11, the apparatus includes: a first processor 1110; a first memory 1120 configured to store instructions that are capable of being executed by the processor; and a first transmission device 1130 configured to transmit and receive data for communication under the control of the processor.

The first processor 1110 is configured to perform the following operations: detecting a signal of a periodic block, and recording a timestamp of the periodic block; and determining a time at which a time information message to be sent according to the timestamp of the periodic block matched with the time information message, and generating a timestamp of the time information message.

A device for determining time information, which is applied to a receiving end, is further provided according to an embodiment of the present disclosure, and the device is configured to implement the above embodiments and examples, which have been described above and will not be repeated here. The term "module" used below may be a combination of software and/or hardware that may perform predetermined functions. Although the devices described in the embodiments below may be implemented by software, it is possible and may be envisaged that that the device is implemented by hardware or a combination of software and hardware.

Figure 12:
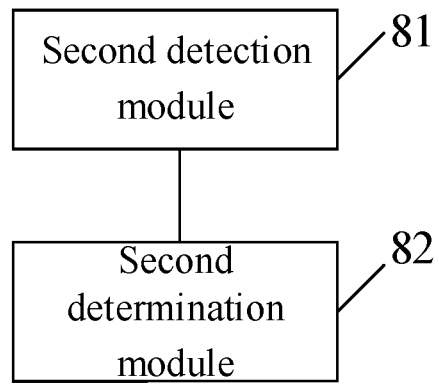
FIG. 12 is a schematic diagram of a device for determining time information, which is applied to a receiving end, according to an embodiment of the present disclosure.

As shown in FIG. 12, the device for determining time information according to an embodiment of the present disclosure includes: a second detection module 81 configured to detect a signal of a periodic block, and record a timestamp of the periodic block; and a second determination module 82 configured to determine a time at which a time information message to be received, according to the timestamp of the periodic block matched with the time information message.

In one embodiment, the periodic block is an AM, and the second detection module 81 is configured to: receive data sent by a transmitting end, detect a signal of an AM in the data, identify the AM, and record a timestamp of the AM if the identification is successful.

In one embodiment, the periodic block is an AM, and the second detection module 81 is configured to: receive the data sent by the transmitting end, detect a signal of an AM in the data, identify the AM, take a counter timestamp corresponding to the AM as a timestamp of the AM, and record the counter timestamp.

In one embodiment, the second detection module 81 is configured to: search for the signal of the AM in the data; and determine that the identification is successful if the AM is successfully identified at a position of AM in the data in each of two consecutive periods; otherwise, determine that the identification fails, the period being a period of the AM.

In one embodiment, the device further includes: a counter module configured to start or restart a counter every time the AM in the data is successfully identified by the second detection module. The counter generates the counter timestamp according to a period of the alignment mark.

In one embodiment, in the case where the periodic block is a virtual AM, the device further includes: a second generation module configured to generate the virtual AM.

In one embodiment, the second determination module 82 is configured to: determine a time interval between an identifier carried by the time information message and the periodic block matched with the time information message; and determine the time at which the time information message to be received according to the time interval and the timestamp of the periodic block matched with the time information message.

In the embodiments of the present disclosure, the periodic block is used as a timestamp reference, thereby avoiding the uncertain delay and effectively improving the time accuracy, for example, an accuracy of 100 G sub-ns level can be reached.

Figure 13:
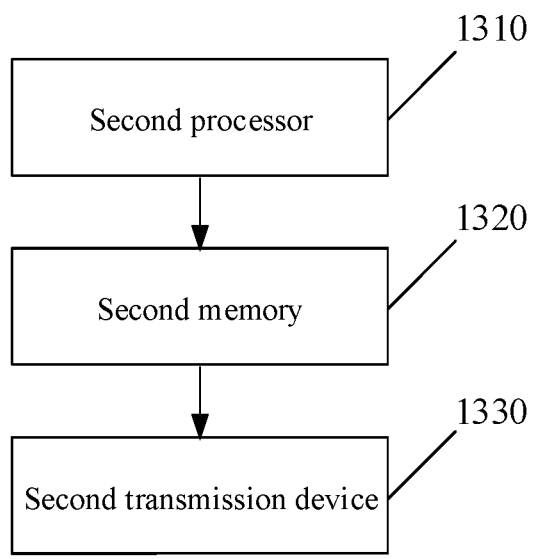
FIG. 13 is a schematic structural diagram of another apparatus for determining time information according to an embodiment of the present disclosure.

An apparatus for determining time information is further provided according to an embodiment of the present disclosure. As shown in FIG. 13, the apparatus includes: a second processor 1310; a second memory 1320 configured to store instructions that are capable of being executed by the processor; and a second transmission device 1330 configured to transmit and receive data for communication under the control of the processor.

The second processor 1310 is configured to perform the following operations: detecting a signal of a periodic block, and recording a timestamp of the periodic block; and determining a time at which a time information message to be received, according to the timestamp of the periodic block matched with the time information message.

The embodiments of the present disclosure further provide a computer-readable storage medium having computer-executable instructions stored therein, and the computer-executable instructions are configured to perform the method for determining time information that is applied to a transmitting end.

The embodiments of the present disclosure further provide a computer-readable storage medium having computer-executable instructions stored therein, and the computer-executable instructions are configured to perform the method for determining time information that is applied to a receiving end.

In the embodiments, the above storage media may include, but are not limited to, various media capable of storing program codes, such as Universal Serial Bus Flash Disks (USB flash disks), Read-Only Memories (ROMs), a Random Access Memories (RAMs), mobile hard disks, magnetic disks, and optical discs.

It should be understood by those skilled in the art that all the above modules or steps in the embodiments of the present disclosure may be implemented by using general purpose computing devices, and may be collectively arranged in a single computing device or be distributed in a network composed of a plurality of computing devices. In one embodiment, the modules or steps may be implemented by program codes executable by a computing device, and therefore, may be stored in a memory and executed by the computing device, and the steps illustrated or described may be performed in an order different from that described herein in some cases; or each of the modules and steps may be formed into an individual integrated circuit module; or a plurality of the modules or steps may be implemented by being formed into a single integrated circuit module. Thus, the embodiments of the present disclosure are not limited to any specific combination of hardware and software.

What is claimed is:

1. A method for determining time information, comprising:
   detecting periodic blocks, and generating timestamps of the periodic blocks, wherein the periodic blocks are real alignment marks inserted in a physical coding sublayer or virtual alignment marks;
   determining a time interval between an identifier carried by a time information message to be sent and a periodic block matched with the time information message among the periodic blocks according to a number of bits between the identifier and the periodic block matched with the time information message; and
   determining time at which the time information message to be sent according to the time interval and a timestamp of the periodic block matched with the time information message, and generating a timestamp of the time information message.

2. The method of claim 1, in a case where the periodic blocks are the virtual alignment marks, before detecting the periodic blocks and generating the timestamps of the periodic blocks, the method further comprises:
   generating the virtual alignment marks.

3. The method of claim 1, wherein the periodic block matched with the time information message is a periodic block located before and adjacent to the time information message among the periodic blocks.

4. The method of claim 1, wherein:
   the identifier is located at a position of a start frame delimiter (SFD), or at a position of an overhead header.

5. The method of claim 1, after generating the timestamps of the periodic blocks, the method further comprises:
   discarding the time information message, in response to determining that the time interval between the identifier carried by the time information message to be sent and the periodic block matched with the time information message is greater than a preset threshold.

6. The method of claim 5, wherein:
   the preset threshold is ⅛ of a period of the periodic blocks.

7. An apparatus for determining time information, comprising:
a processor;
a memory configured to store instructions that are capable of being executed by the processor; and
a transmission device configured to transmit and receive data for communication under the control of the processor;
wherein the processor is configured to perform the method of claim 1.

8. A non-transitory computer-readable storage medium having computer-executable instructions stored therein, wherein the computer-executable instructions are executed by a processor to implement the method of claim 1.

9. A method for determining time information, comprising:
detecting periodic blocks, and obtaining timestamps of the periodic blocks, wherein the periodic blocks are real alignment marks inserted in a physical coding sublayer or virtual alignment marks;
determining a time interval between an identifier carried by a time information message to be received and a periodic block matched with the time information message among the periodic blocks according to a number of bits between the identifier and the periodic block matched with the time information message; and
determining time at which the time information message to be received according to the time interval and a timestamp of the periodic block matched with the time information message.

10. The method of claim 9, wherein the periodic block is an alignment mark; and
detecting the periodic blocks, and obtaining the timestamps of the periodic blocks comprises:
receiving data sent by a transmitting end, detecting pulse signals of the alignment marks in the data, and identifying the alignment marks;
obtaining the timestamps of the alignment marks, in response to successful identification; and
taking counter timestamps corresponding to the alignment marks as the timestamps of the alignment marks and recording the timestamps of the alignment marks, in response to failed identification.

11. The method of claim 10, wherein detecting the signal of the alignment mark in the data and identifying the alignment mark comprises:
searching for the pulse signals of the alignment marks in the data;
determining that the identification is successful, in response to successfully identifying an alignment mark at a position of the alignment mark in the data in each of two consecutive periods; and
determining that the identification fails, in response to identifying no alignment mark at a position of an alignment mark in the data in at least one of two consecutive periods;
wherein each of the two consecutive periods is a period of the alignment marks.

12. The method of claim 10, further comprising:
starting or restarting a counter, every time an alignment mark in the data is successfully identified, to generates the counter timestamps according to a period of the alignment marks.

13. The method of claim 9, in a case where the periodic blocks are the virtual alignment marks, before detecting the periodic blocks, the method further comprises:
generating the virtual alignment marks.

14. The method of claim 9, wherein the periodic block matched with the time information message is a periodic block located before and adjacent to the time information message among the periodic blocks.

15. The method of claim 9, wherein:
the identifier is located at a position of a start frame delimiter (SFD), or at a position of an overhead header.

16. An apparatus for determining time information, comprising:
a processor;
a memory configured to store instructions that are capable of being executed by the processor; and
a transmission device configured to transmit and receive data for communication under the control of the processor;
wherein the processor is configured to perform the method of claim 9.

17. A non-transitory computer-readable storage medium having computer-executable instructions stored therein, wherein the computer-executable instructions are executed by a processor to implement the method of claim 9.

* * * * *